United States Patent

Uchiyama

(10) Patent No.: US 8,781,313 B2
(45) Date of Patent: Jul. 15, 2014

(54) LENS APPARATUS AND IMAGE PICKUP SYSTEM

(71) Applicant: Canon Kabushiki Kaisha, Tokyo (JP)

(72) Inventor: Minoru Uchiyama, Utsunomiya (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/892,442

(22) Filed: May 13, 2013

(65) Prior Publication Data

US 2013/0308933 A1 Nov. 21, 2013

(30) Foreign Application Priority Data

May 18, 2012 (JP) ................................. 2012-113984

(51) Int. Cl.
   *G03B 13/36* (2006.01)
(52) U.S. Cl.
   USPC .................. 396/81; 396/93; 396/97; 396/103
(58) Field of Classification Search
   CPC .......... G02B 7/28; G02B 7/282; G03B 13/36; H04N 5/23212
   USPC ............................. 396/79–83, 91, 93, 97, 103
   See application file for complete search history.

(56) References Cited

U.S. PATENT DOCUMENTS

| 5,325,145 | A | * | 6/1994 | Hirasawa | 396/81 |
| 5,614,983 | A | * | 3/1997 | Iwane et al. | 396/97 |
| 5,854,948 | A | * | 12/1998 | Tsukada | 396/93 |
| 6,924,941 | B2 | * | 8/2005 | Okada et al. | 359/698 |
| 2001/0045989 | A1 | * | 11/2001 | Onuki | 348/345 |
| 2006/0044456 | A1 | * | 3/2006 | Ohta | 348/360 |
| 2013/0308933 | A1 | * | 11/2013 | Uchiyama | 396/125 |

FOREIGN PATENT DOCUMENTS

JP 2008-227799 A 9/2008

* cited by examiner

*Primary Examiner* — W B Perkey
(74) *Attorney, Agent, or Firm* — Rossi, Kimms & McDowell LLP

(57) ABSTRACT

A lens apparatus detachable from an image pickup apparatus includes a focus lens, a driver configured to drive the focus lens, a first position detector configured to detect a position of the focus lens, and a controller configured to correct the position of the focus lens detected by the first position detector to a position of the focus lens in a predetermined optical characteristic, to transmit a corrected position of the focus lens to the image pickup apparatus, to correct driving information of the focus lens in the predetermined characteristic received from the image pickup apparatus to driving information of the focus lens in a current optical characteristic, and to instruct the driver to drive the focus lens in accordance with the position of the focus lens detected by the first position detector and corrected driving information of the focus lens.

13 Claims, 6 Drawing Sheets

LENS APPARATUS AND IMAGE PICKUP SYSTEM

BACKGROUND OF THE INVENTION

1. Field of the Invention

The present invention relates to a lens apparatus and an image pickup system.

2. Description of the Related Art

According to one known lens interchangeable type camera system, a camera body has an autofocus ("AF") function and a focus preset function ("FP") configured to move a focus lens to a stored position, and a lens apparatus includes a driver and a position detector of the focus lens. A current focus position (as a position of the focus lens) is transmitted from the lens apparatus to the camera body, and a target focus position or moving amount is transmitted from the camera body to the lens apparatus based upon it.

Japanese Patent Laid-Open No. ("JP") 2008-227799 proposes a method for solving a change of a movable range of a focus lens with a zoom position in a rear focus lens. In the rear focus lens, as a zoom position (as a position of the zoom lens) is changed, a focus position shifts and it is necessary to move the focus position according to the zoom position so as to focus upon the same object distance. A relationship between the zoom position and the focus position is referred to as a "cam locus."

However, due to an individual difference caused by a manufacturing error of each component, a temperature change, and an insertion/ejection states in/from the optical axis of a variety of filters, a relationship between the focus position and the object distance can be changed from the designed value or previous state information of the focus position. Since the performance and temperature of each component as well as an insertion/ejection (optical condition) of each filter affect the optical performance of the camera system, they may be referred to as an "optical characteristic" hereinafter. For example, the cam locus may shift from the designed value due to an individual difference, an optical characteristic at a position stored in the FP may differ from the current optical characteristic, and an optical characteristic in the scan used to detect the contrast peak position in the contrast AF may differ from the current optical characteristic. Then, none of the focus position of the designed value, the position stored in the FP function, and the focus position corresponding to a detected contrast peak position corresponds to a target object distance. JP 2008-227799 does not consider a focus shift caused by a change of the optical characteristic.

SUMMARY OF THE INVENTION

The present invention provides a lens apparatus and an image pickup system for a lens interchangeable type image pickup system, which can maintain a relationship between a focus position and an object distance utilizing a comparatively simple configuration.

A lens apparatus detachable from an image pickup apparatus includes a focus lens configured to provide focusing, a driver configured to drive the focus lens, a first position detector configured to detect a position of the focus lens, and a controller configured to correct the position of the focus lens detected by the first position detector to a position of the focus lens in a predetermined optical characteristic, to transmit a corrected position of the focus lens to the image pickup apparatus, to correct driving information of the focus lens in the predetermined characteristic received from the image pickup apparatus to driving information of the focus lens in a current optical characteristic, and to instruct the driver to drive the focus lens in accordance with the position of the focus lens detected by the first position detector and corrected driving information of the focus lens.

Further features of the present invention will become apparent from the following description of exemplary embodiments with reference to the attached drawings.

DESCRIPTION OF THE EMBODIMENTS

Figure 1:
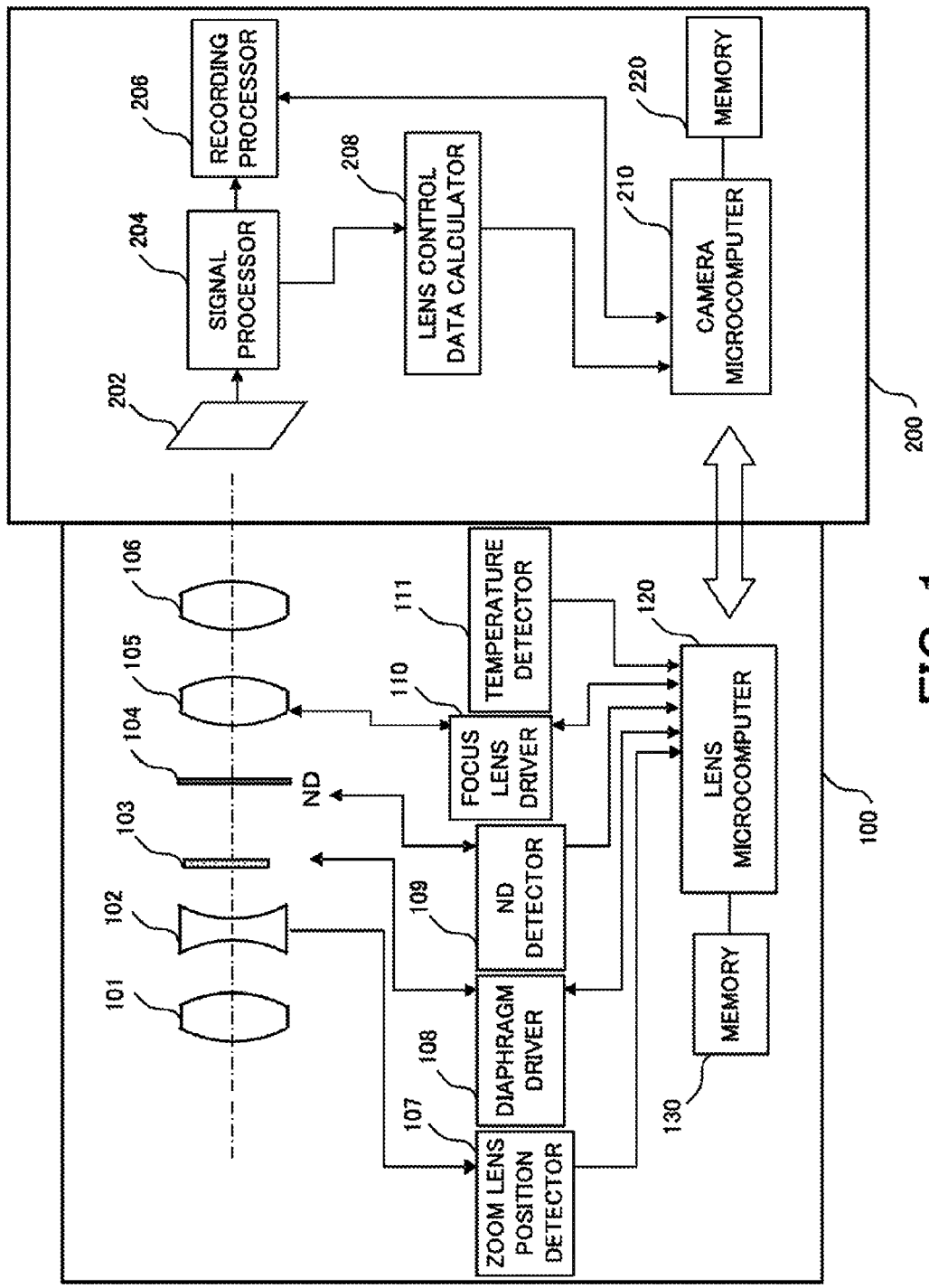
FIG. 1 is a block diagram of a camera system according to this embodiment.

FIG. 1 is a block diagram of a lens interchangeable type camera system (image pickup system, optical apparatus) according to this embodiment. The camera system includes a lens apparatus (optical apparatus) 100 and a camera body (image pickup apparatus or optical apparatus) 200. The lens apparatus is detachably attached to the camera body 200.

The lens apparatus 100 includes an image pickup optical system, a zoom lens position detector 107, a diaphragm driver 108, an ND detector 109, a focus lens driver 110, a temperature detector 111, a lens microcomputer 120, and a memory 130.

The image pickup optical system includes a plurality of optical lens elements (optical elements), is housed in a lens barrel (not illustrated), and forms an optical image of an object on an image sensor 202 in the camera body 200. The image pickup optical system of this embodiment includes, in order in an incident direction of object light, a first lens 101, a zoom lens (magnification varying lens) 102, a diaphragm 103, an ND filter 104, a focus lens 105, and a fourth lens 106. In FIG. 1, the number of lenses included in each lens unit is not limited.

The zoom lens 102 is moved in the optical axis direction illustrated by a dotted line and configured to adjust a focal length when a user operates an operating unit (not illustrated). The zoom lens position detector 107 serves as a second position detector configured to detect a position of the zoom lens 102 (zoom position) using, for example, a variable resistor, and send the zoom position to the lens microcomputer 120.

The diaphragm 103 is driven by a diaphragm driver 108 in accordance with a command of the lens microcomputer 120, and can vary its aperture value. The diaphragm 103 is configured to adjust a light quantity by changing its aperture value. The diaphragm driver 108 can use, for example, a stepping motor and a voice coil motor ("VCM"), and a detector (optical characteristic detector) configured to detect a diaphragm position (current aperture value) using a Hall detector configured to detect the current in the coil.

As the aperture value changes, the focus position shifts and it is thus necessary to correct the position of the focus lens 105

(focus position). In this case, an aperture value and a focus moving amount (shift amount of a focus position) can be calculated using plural data corresponding to diaphragm positions and linear interpolation for intermediate values of the diaphragm positions. As provided by a focus correcting amount=A×(aperture value-maximum aperture value), the focus correcting amount can be calculated by multiplying an aperture value difference made by subtracting an aperture value when the camera is operated from an maximum aperture value by a focus temperature change rate (coefficient) A.

The ND (neutral density) filter 104 can be inserted into and ejected from an optical axis as the user operates the operating unit (not illustrated), and is configured to adjust a light quantity. The ND detector 109 serves as an optical characteristic detector configured to detect whether the ND filter 104 is inserted or ejected. The ND detector 109 includes, for example, a photo-interrupter, and sends a detection result to the lens microcomputer 120. The number of ND filters 104 is not limited, and another optical element, such as a color filter, may be made selectable.

When the ND filter 104 is not inserted, the refractive index of a space in which the ND filter 104 is inserted is a refractive index of air that is exactly the optical design value but when the ND filter 104 is inserted, it is the refractive index of a material of the ND filter 104. When the ND filter 104 is inserted, a focus position shifts due to a difference between the refractive index of air and the refractive index of the ND filter 104 and it is thus necessary to correct the focus position.

In a roulette type where the color filters the ND filters 104 having different concentrations are switched, an insertion state of each filter is detected, and a correction value that is different according to a refractive index and a thickness of each filter is previously stored in the memory 130. The correction value to the detected filter is read out of the memory 130 and used to correct the focus position. In addition, when an undetectable filter, such as an attachment, is attached, a focus position may be corrected by freely writing a correction value/manual value selector in the camera body through a user, and by selecting it when it is used.

The focus lens 105 is driven in the optical axis direction by the focus lens driver 110 in accordance with driving information (driving command) from the lens microcomputer 120 and configured to provide focusing. The lens microcomputer 120 obtains a driving amount (including the driving pulse number) and a drive position (including a target position of the focus lens 105) of the focus lens driver 110.

Figure 2:
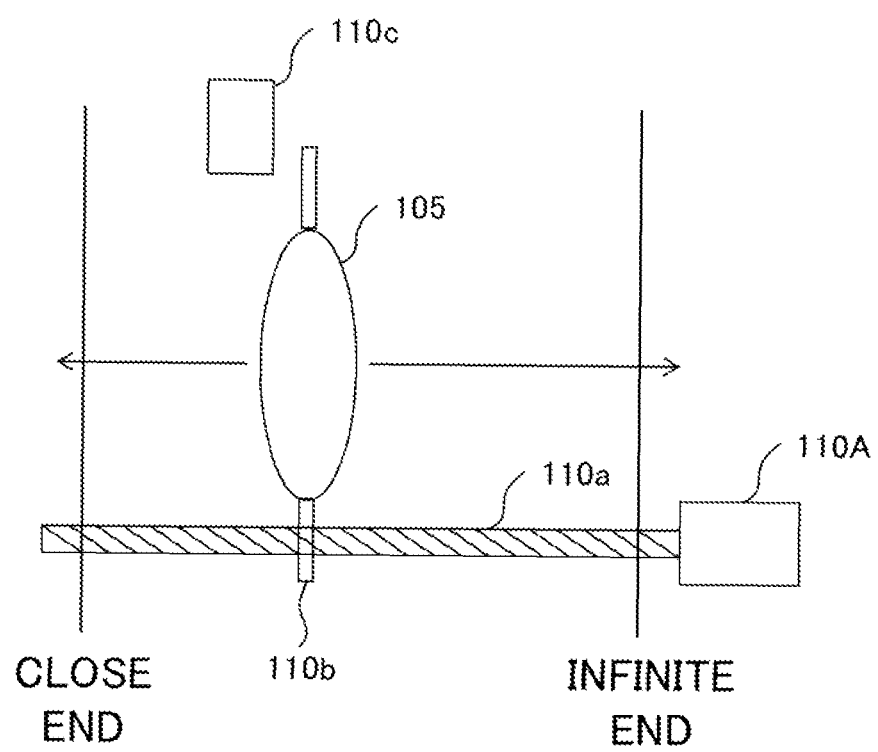
FIG. 2 is a block diagram for explaining a driving method of a focus lens illustrated in FIG. 1.

FIG. 2 is a block diagram when the focus driver 110 utilizes a stepping motor 110A. The focus lens 105 is coupled with a lead screw 110a via a rack 110b. A photo-interrupter 110c serves as a first position detector configured to detect a position of the focus lens 105. When the stepping motor 110A rotates the lead screw 110a, the rotation is converted into a translational movement by the rack 110b, and as a result the focus lens 105 moves in the arrow direction. The position of the focus lens 105 can be detected by counting the driving pulses of the stepping motor 110A at this time. When the count starting point of the pulse is different, the position of the focus lens 105 shifts. Accordingly, the stepping motor 110A is initially driven to scan a whole range, and moved to a position at which a signal of the photo-interrupter 110c changes. This point is set to an origin (reference position). The focus position based upon the photo-interrupter 110c can be obtained by increasing and decreasing the driving pulse number of the stepping motor 110A from the origin.

When the focus driver 110 utilizes a unit in which has a minimum moving amount is not set, as in a DC motor and a VCM driven by an electromagnetic operation with a magnet and a coil, the position of the focus lens 105 can be detected by separately preparing an electric position detector by using the electric position detector to measure a position.

The temperature detector 111 is arranged in the lens barrel and around the image sensor, and serves as an optical characteristic detector configured to transmit the temperature of each position to the lens microcomputer 120. The number of temperature detectors 111 is not limited. For example, it may be arranged on the outer surface so as to measure the external temperature or may be arranged for each component having a different coefficient of thermal expansion. Since the focus position shifts as the lens barrel and image pickup optical element extend and shrink as the temperature changes, it is necessary to correct the focus position.

The correcting position of the focus lens may be calculated by preparing correcting data for a combination of focus shifts caused when the ND filter 104 is inserted and ejected, focus shifts caused by the temperature change, and focus shifts caused by an aperture value. In correcting the position of the focus lens, independent correction values may be summed up.

The lens microcomputer 120 serves as a controller configured to communicate with the camera microcomputer 210 in the camera body 200, and to control each component in the lens apparatus 100. The memory 130 stores information and programs necessary for operations of the lens microcomputer 120.

The camera body 200 includes an image sensor (image pickup element) 202, a signal processor 204, a recording processor 206, a lens control data calculator 208, a camera microcomputer (image pickup apparatus controller) 210, and a memory 220.

The image sensor 202 is a photoelectric converter, such as a CCD sensor and a CMOS sensor, configured to photoelectrically convert an object image (optical image) formed by image pickup optical system into an analogue signal and to output the analogue signal. The output of the image sensor 202 is sampled, gain-controlled, and converted into a digital signal.

The signal processor 204 performs a variety of image processing, such as amplification, a color correction, and white balancing, for a signal from the image pickup element 202, and generates a video signal. The recording processor 206 outputs an image to a recording medium and a display unit.

The lens control data calculator 208 generates a signal necessary to control the lens, such as an auto-exposure ("AE") signal, an autofocus ("AF") signal, and a vector signal, for the AE, AF, and motion vectors based upon the output from the signal processor 204. The AE signal is generated by integrating a brightness signal by one screen or specific area, and by preparing evaluation value data used to evaluate how far the brightness shifts from the proper exposure state. The AF signal is generated by utilizing one or more high frequency signal integrated values made by integrating an amount of a high frequency component extracted by a high-pass filter in the lens control data calculator 208 for a plurality of specific areas in the brightness signal. The AF signal represents the sharpness (contrast state) of the image, and the sharpness varies according to the focus state of the image pickup optical system. Therefore, the AF signal a signal representing an in-focus state of the image pickup optical system. The lens control data calculator 208 serves as a focus signal generator configured to generate a focus signal representing the focus state. Thus, the lens control data is transmitted to the camera microcomputer 210.

The camera microcomputer 210 communicates with the lens microcomputer 120 at a predetermined cycle or at necessary time, sends lens control data to the lens microcomputer 120, and receives a variety of statuses from the lens microcomputer 120. The memory 220 stores information necessary for the camera body 200, the lens apparatus 100, and a variety of controls. The camera microcomputer 210 stores the position of the focus lens 105 in the memory 220, and serves as a focus preset unit configured to command the lens microcomputer 120 to move the focus lens 105 to the stored position of the focus lens 105. The lens microcomputer 120 controls driving of each component in accordance various lens control data received from the camera microcomputer 210.

In order to provide focusing upon the same object distance in the rear focus lens, it is necessary to move the focus lens 105 to the focus position corresponding to the zoom position in the cam locus. In the rear focus lens, the resolution is different according to the zoom position from the infinite end to the close end, and the pulse number of the stepping motor from the infinite end to the close end generates a range difference of 10 times between the wide angle end and the telephoto end. Hence, the position stored in the present function may not provide in-focus. A change of the movable range of the focus lens also poses a problem.

The in-focus can be obtained even when the zoom position changes, by storing the cam locus depending upon the object distance and the zoom position in the memory 130 and by referring to that information. A highly precise position can be calculated for a middle zoom position and a focus position other than representative points utilizing the linear interpolation.

Figure 4:
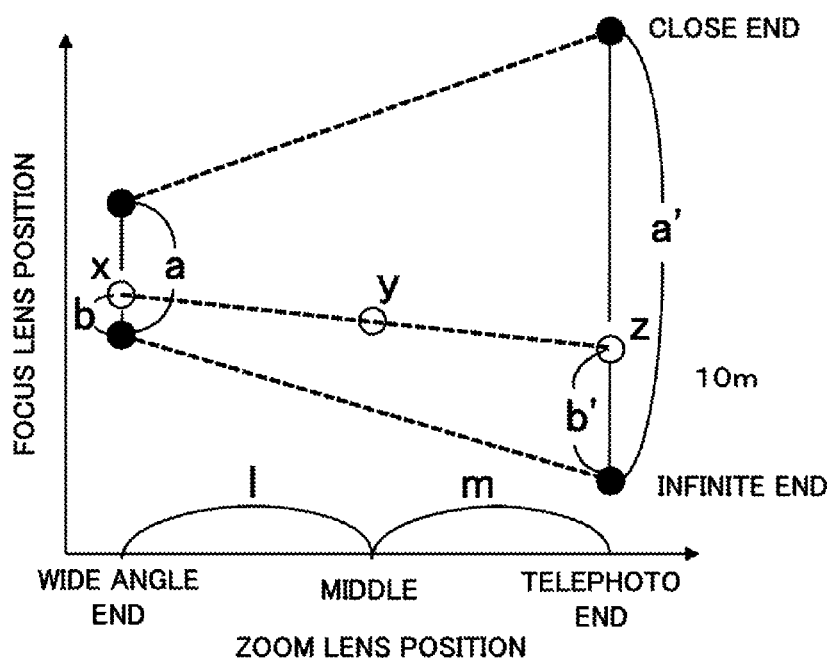
FIG. 4 is a view of an illustrative cam locus.

FIG. 4 is a graph illustrating a relationship between the zoom lens position and the focus lens position. An abscissa axis denotes a zoom position where a wide angle end is set to the left side and a telephoto end is set to the right side. An ordinate axis denotes a focus position, where an infinite side is set to the bottom side and the close side is set to the top side. The zoom position and the focus position for four points, such as the infinite end, the close end, the wide angle end, and the telephoto end, are stored in the memory 130.

In the following description, a current zoom position is located at the wide angle end, and a focus position is x focused upon the object distance of 10 m. Then, the zoom position is moved to a middle position, and a focus position y corresponding to the object distance of 10 m is calculated.

Since a ratio between a distance "a" between the close end and the infinite end at the wide angle end and a distance "b" between the position x and the infinite end at the wide angle end is equal to a ratio between a distance "a'" between the close end and the infinite end at the telephoto end and a distance "b'" between a position z and the infinite end at the telephoto end, the position z is calculated. Next, the focus position y is calculated based upon a ratio of a distance of l:m between a distance from the middle position to the wide angle end and a distance from the middle position to the telephoto end, the focus position x, and the focus position z. As the number of representative points used for the relationship between the object distance and the zoom position increases, the focus position can be highly precisely obtained.

Due to the individual difference of each component in the camera system, a designed cam locus may not be obtained. In order to correct the cam locus, a shift amount of the focus position from the designed value for the predetermined zoom position and the predetermined object distance is measured and stored in the memory 130 in the lens apparatus 100, and the shift is corrected in focusing. The focus shift caused by the individual difference of the optical element contains a focus shift caused by the manufacturing error for each zoom position, and a focus shift caused by the central light flux and the peripheral light flux of the lens.

Figure 5:
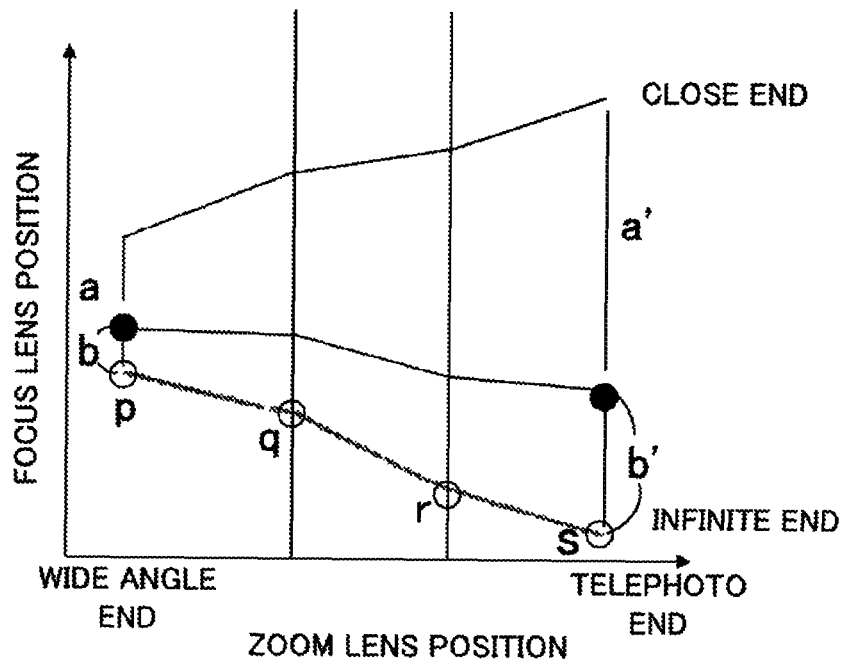
FIG. 5 is a view of a cam locus when there is an individual difference.

FIG. 5 is a graph of a cam locus when there is an individual difference, and the ordinate and abscissa axes are defined similar to FIG. 4. Each of "p," "q," "r," and "s" represents an infinite end at the wide angle end, the middle position, the middle position, and the telephoto end, respectively. A shift amount of the focus position is obtained (for example by the correction value calculator 121 which will be described later) by moving the focus lens 105 at each zoom position for focusing, and by comparing the focus position at that time with data in the memory 130. The in-focus state can be obtained by storing information of the shift amount in the memory 130 for each zoom position, and by correcting the shift amount when the focus lens 105 is moved. A linear interpolation may be utilized so as to maintain a sequential line graph. Instead of or together with the infinite end, information of the cam locus corrected with the close end may be obtained.

Since the lens barrel and the lens in the image pickup apparatus in the lens apparatus 100 slightly extend or shrink as the temperature changes, the temperature change causes a focus shift because the flange focal length (flange back: FB) extends or reduces that is a distance from the lens apparatus 100 and the image sensor 202 in the camera body 200.

Figure 6:
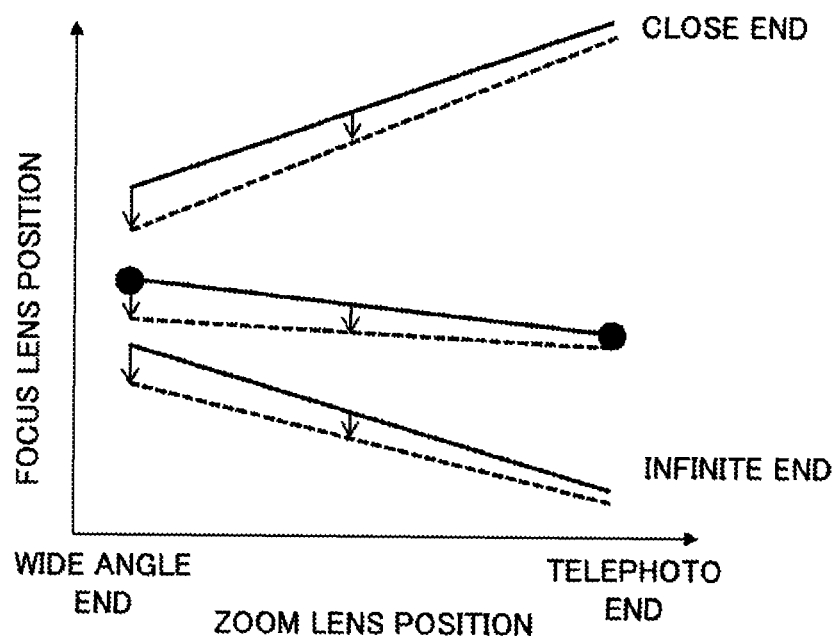
FIG. 6 is a view of a cam locus before and after a flange focal length correction when there is a temperature change.

FIG. 6 is a graph illustrating a relationship between a pre-correction (solid line) and a post-correction (dotted line) of the cam locus when the FB correction to the temperature change is made, where the abscissa and ordinate axes are defined similar to FIG. 4. The FB correction amount can be calculated by multiplying a difference between the temperature of the designed value and the current temperature detected by the temperature detector 111 by the focus temperature change ratio (coefficient) A as provided by FB correction amount=A×(temperature at the operation−temperature of the set amount).

Since the sensitivity changes according to the zoom position, the actual focus correction amount is found by multiplying the FB correction amount by the sensitivity of each zoom position. The focus can be corrected by moving the focus lens 105 by this correction amount. The sensitivity represents a moving amount of the image sensor 202 in the optical axis direction corresponding to a predetermined moving amount of the focus lens 105 in the optical axis direction. Since the FB of the camera body 200 changes as the temperature changes, the camera microcomputer 210 may also calculate the FB correction amount, transmit it to the lens microcomputer 120, and drive the focus lens 105 so as to correct the temperature.

Figure 3A:
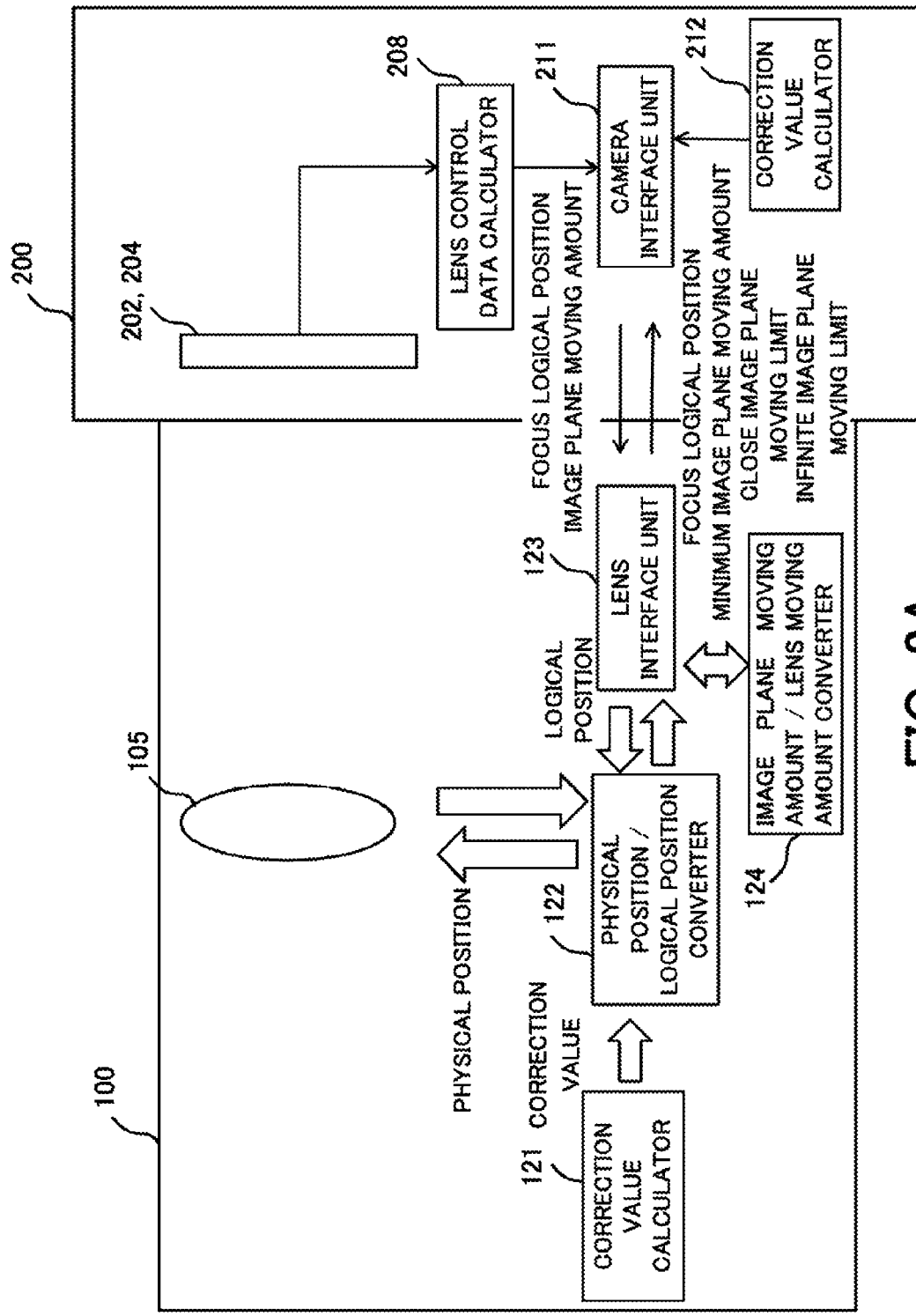
FIGS. 3A-3C are views relating to a focus position used for the camera system illustrated in FIG. 1.

FIG. 3A is a block diagram relating to a focus position in the lens interchangeable camera system according to this embodiment. A correction value calculator 121, a physical position/logical position ("PL") converter 122, a lens interface unit 123, an image plane moving amount/lens moving amount converter 124 corresponds to processing and data in the lens microcomputer 120. The camera interface unit 211 and the correction calculator 220 correspond to processing and data in the camera microcomputer 210.

Initially, the current position of the focus lens 105 is detected by the first position detector. This position represents a physical position of the focus lens 105, and thus may be referred to as a "focus physical position" hereinafter. As described later, the focus physical position is not necessarily focused upon the same focus physical position with the same object distance when the optical characteristic is different, such as the individual characteristic, temperature, and optical condition of each component. The individual difference of each component and the temperature change are expressed by a difference from the designed value (reference state), and the change of the optical condition, such as an insertion/ejection of a filter, is a difference from the reference state, such as a state having no filter. Accordingly, this embodiment refers to the reference state in which the individual characteristic, temperature, and optical condition of each component of the lens apparatus are predetermined as the "predetermined optical characteristic (reference optical characteristic)" and distinguishes it from the "actual optical characteristic."

Now assume a "focus logical position" as a focus position corresponding to an object distance, which is not affected by the optical characteristic. The focus logical position is a focus position in which the current optical characteristic is converted into or corrected to the predetermined optical characteristic. Initially, the correction value calculator 121 calculates a sum of the focus correction amounts (focus moving amount) based upon the current optical characteristic, and the PL converter 122 converts the focus physical position into the focus logical position by eliminating the focus correction value from the focus physical position. As described above, the correction value depends upon a difference between the current optical characteristic and the predetermined optical characteristic (optical characteristic in the design value).

At this time, an individual difference is considered: Each of a variety of correction related parameters is corresponded to a focus physical position through matching by detecting an optical characteristic for an object of a known object distance, such as a chart of an infinite collimator. Then, the focus physical position is converted into the focus logical position by calculating a focus correction amount corresponding to a change of an optical characteristic, and by subtracting it from the focus physical position.

Figure 3B:
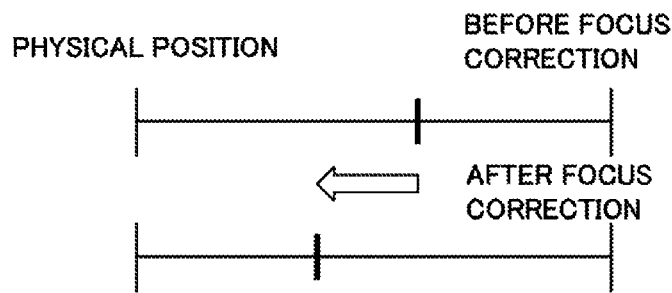
Figure 3C:
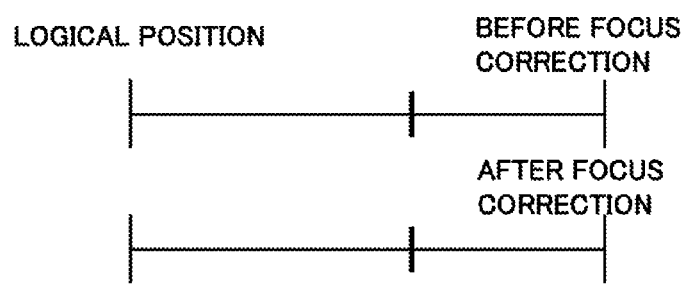

FIG. 3B illustrates a relationship between the focus physical position before and after the focus position is corrected. As illustrated in FIG. 3B, the focus physical position changes before and after the focus position is corrected. FIG. 3C illustrates a relationship between the focus logical position before and after the focus position is corrected. As illustrated in FIG. 3C, the focus logical position is constant before and after the focus position is corrected. The lens interface unit 123 transmits the focus logical position to the camera interface unit 211.

On the other hand, the lens control data calculator 208 may calculate a moving amount of the focus lens 105 based upon a video signal obtained from the image sensor 202 and the signal processor 204, and the correction value calculator 212 may calculate and designate an FB shift amount etc. in the camera body 200 side. In this case, designating an image plane moving amount is advantageous because it is not affected by the state of the lens apparatus 100. When the camera microcomputer 210 executes the preset function, the position of the focus lens 105 may be designated by the focus logical position sent from the lens microcomputer 120. In this case, it is more advantageous to directly designate the pulse number of the focus lens 105. It is thus necessary to realize two types of designations.

Since the focus logical position has already been sent to the camera microcomputer 210, designated the focus position using the focus logical position is not influenced by the optical condition. The image plane moving amount is driving information of the focus lens 105 in the predetermined optical characteristic. The image plane moving amount is converted into the moving amount of the focus lens 105 by the IL converter 124. The memory 130 previously stores optical sensitivity data. The IL converter 124 converts the transmitted image plane moving amount into the lens logical moving amount utilizing the optical condition (such as a zoom position and a diaphragm position) that affects the current focus position and optical sensitivity, and the optical sensitivity data stored in the memory 130. The converted lens logical moving amount is converted into the physical position in the current optical characteristic by the PL converter 122, and thereby the target position of the focus lens 105 is determined.

The camera microcomputer 210 may designate the focus position using the focus logical position or the image plane moving amount or a combination of them. In the designation with the image plane moving amount, the minimum image plane moving amount changes according to the sensitivity and the resolution of the pulse, the IL converter 124 calculates the minimum image plane moving amount, and the lens microcomputer 120 transmits it to the camera microcomputer 210. When the lens microcomputer 120 converts the pulse number from the current position to each of the close and infinite ends into the image plane and transmits it to the camera microcomputer 210, the camera microcomputer 210 recognizes the current maximum moving amount and minimum moving amount and can designate the focus position in this range. Thereby, the camera microcomputer 210 can control the focus position without being affected by the focus correction and optical sensitivity caused by the optical condition of the lens apparatus 100.

Only the focus logical position cannot handle a change of the zoom position In the rear focus lens, and thus both the focus logical position and the corresponding zoom position are designated. Thereby, when the zoom position and the focus logical position designated by camera microcomputer 210 are different from the current zoom position of the lens apparatus 100, the focus logical position corresponding to the same object distance at the current zoom position can be calculated based upon the cam locus.

The zoom position, and the focus position that is made by eliminating the correcting amount from the focus physical position may be defined as one focus logical position. The camera microcomputer 210 can control the focus position even in the rear focus lens without being affected by the zoom fluctuation by thus designating the zoom position.

For example, the lens microcomputer 120 obtains the focus position at the predetermined zoom position based upon the position of the zoom lens 102 detected by the zoom lens position detector 107 and the first cam locus (lower dotted line in FIG. 4) for the designed value relating to the predetermined object distance, such as the infinite end. This is the focus logical position (or corrected position of the focus lens). The lens microcomputer 120 obtains the target position of the focus lens 105 based upon the driving information of the focus lens 105 for the designed value received from the camera microcomputer 210. The lens microcomputer 120 drives the focus lens 105 to the position of the focus lens 105, where the position of the focus lens 105 corresponds to a zoom position in the second cam locus (lower pqrs line in FIG. 5) in the current optical characteristic, and the zoom position corresponds to the target position in the cam locus illustrated in FIG. 4. The lens microcomputer 120 may obtain the zoom position from the camera microcomputer 210. In this case, the lens microcomputer 120 drives the focus lens 105 to the position of the focus lens 105 corresponding to this zoom position in the second cam locus (lower pqrs line in FIG. 5) in the current optical characteristic.

Figure 7:
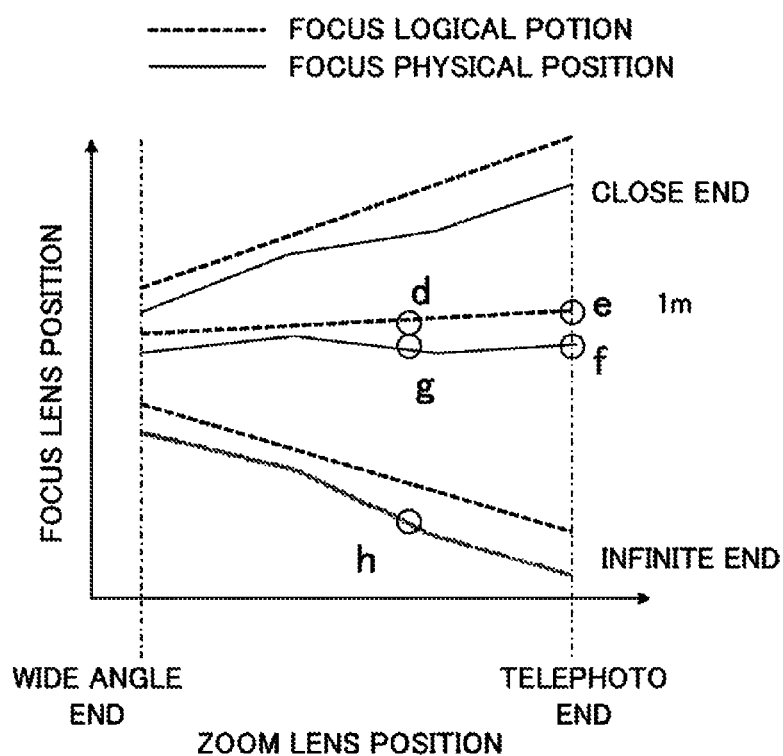
FIG. 7 is a view of a cam locus in a focus preset.

FIG. 7 is a graph of a cam locus in the focus preset, and the abscissa and ordinate axes are defined similar to FIG. 4. The dotted line represents the cam locus for the focus logical position, and the solid line represents the cam locus for the focus physical position, which is a cam-corrected position. The cam represents correspondence between the focus position and the zoom position for each of the object distances of the close end, the infinite end, and 1 m. As described above, the camera microcomputer 210 serves as the FP unit. The position of the focus lens 105 sent by the camera microcomputer 210 that serves as the FP unit to the lens microcomputer 120 is driving information of the focus lens 105 in the predetermined optical characteristic.

For example, a focus logical position is "e" and a focus physical position is "f" where the focus lens 105 is located at the telephoto end and focused on the object of 1 m. When the focus position is stored in the focus preset, information of the zoom position and the focus logical position "e" are transmitted to the camera microcomputer 210 by a periodic communication from the lens microcomputer 120.

Next, when the zoom position and the focus physical position of the focus lens 105 are changed to a position "h" and returned to the position "f" by the FP function, the camera microcomputer 210 transmits the position "e" as the zoom position and the focus logical position to the lens microcomputer 120. The lens microcomputer 120 calculates the focus logical position at the current zoom position based upon the cam locus and the zoom position and the focus logical position at the position "e," and obtains the position "d."

Next, the focus physical position "g" is calculated as a cam correction amount at the position "d." The lens microcomputer 120 executes the focus preset by moving the focus lens 105 to the position "f."

It is unnecessary to transmit and receive the zoom position between the lens microcomputer 120 and the camera microcomputer 210 when it is not a rear focus lens or the zoom position is the same. Even for another correction depends upon another optical condition, a physical position can be calculated based upon the current optical condition data and logical position.

A description will be given of the focus preset when a focus movable range extends in the entire zoom range up to the widest focus movable range from the close end to the infinite end in FIG. 7 (which is the focus movable range at the telephoto end of the zoom position in FIG. 7).

Figure 8:
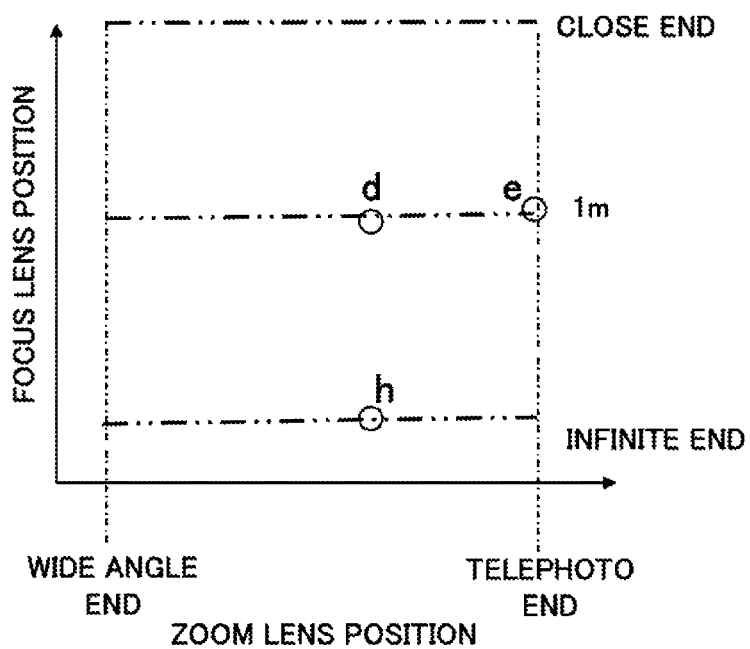
FIG. 8 is a view when a focus movable range for a telephoto end in FIG. 7 is widened to a wide angle end.

FIG. 8 illustrates a cam locus in the focus preset, and serves as a graph in which the focus movable range at the telephoto end in FIG. 7 is extended to the wide angle end. The abscissa and ordinate axes are defined similar to FIG. 7. The cam locus in FIG. 8 is made by normalizing the cam loci in the predetermined optical characteristic (logical position) illustrated by the dotted lines in FIG. 7 for each of the close object distance, the infinite object distance, and the intermediate object distance, by using the maximum distance among distances between the close end and the infinite end for respective zoom positions. Herein, the distance between the infinite end and the close end at the telephoto end in FIG. 7 is maximum.

When the cam locus illustrated in FIG. 8 is obtained, the focus logical position at the position "e" becomes the same as the focus logical position at the position "d." It is therefore unnecessary to calculate the positions "f" and "h," and the general-purpose property improves. The lens microcomputer 120 stores the correspondence between the cam locus illustrated in FIG. 7 and the cam locus illustrated in FIG. 8 in the memory 130, and the information of the cam locus illustrated in FIG. 8 is transmitted to the camera microcomputer 210.

For example, when the camera microcomputer 210 designates the position "h" in FIG. 8 (normalized cam locus), the lens microcomputer 120 obtains focus position by converting the position "h" illustrated in FIG. 8 into the position "h" illustrated in FIG. 7 utilizing information of FIG. 7 (cam locus before normalization). This is driving information of the focus lens 105 in the predetermined optical characteristic. FIG. 8 uses a uniform focus area, a minimum focus moving amount is different according to the zoom position, and an unobtainable focus position may be designated.

This does not actually pose a problem because in converting from the focus logical position to the focus physical position, the focus logical position is approximated and is converted into an optimal focus physical position in which an object distance is as close as possible in the lens apparatus 100 that provides the preset. Although the resolution depends upon the interval of the focus logical position or an obtainable value at a zoom position, the camera microcomputer 210 may designate a value larger than the minimum image plane moving amount as a moving amount. Moreover, as described above, a wide variety of values can be used at the focus physical position, and this does not actually pose a problem.

In the AF, the PL converter 122 converts the focus physical position as the current position of the focus lens 105 into the focus logical position. The lens microcomputer 120 transmits, via the lens interface unit 123, a minimum image plane moving amount, a close-end image plane moving limit, and an infinite-end image plane moving limit obtained based upon the focus logical position, information of the known cam locus, and information of the sensitivity by the IL converter 124. The camera microcomputer 210 obtains the information via the camera interface unit 211, and transmits a driving command to the lens microcomputer 120 so as to wobble the focus lens 105 and determines the peak of the AF evaluation value. This transmitted data contains the current focus logical position received from the lens microcomputer 120 and a target image plane moving amount. The moving amount has a code and the positive means data in the infinite direction.

The lens microcomputer 120 receives the driving command, and the IL converter 124 converts the image plane moving amount into the lens logical moving amount. The lens microcomputer 120 adds the received focus logical position to the lens logical moving, and calculates the target focus logical position. The correction value calculator 121 calculates a correction value based upon the current optical condition. The PL converter 122 converts the target focus logical position into the target focus physical position based upon the calculated correction value. Thereafter, the lens microcomputer 120 instructs the focus lens driver 110 to drive the focus lens 105 to the target focus physical position.

The lens control data calculator 208 confirms a contrast value based upon a video signal from the signal processor 204, then wobbles the focus lens 105 in a reverse direction and similarly confirms a contrast value, and determines an in-focus direction in which there is a peak position. Then, the camera microcomputer 210 transmits the current focus logical position and a larger image plane moving amount to the lens microcomputer 120 so as to move the focus lens 105 by a longer distance in the in-focus direction. As a result, the focus lens 105 is moved to the contrast peak position that provides in-focus (actually returned to the peak position after the lens passes the peak position)

In a focus detection of a phase difference method on an image pickup plane in which the image sensor is provided with an image pickup pixel and a focus detecting pixel, an image plane moving amount corresponding to the detected focus position and a current focus logical position are sent to the lens microcomputer 120 and a phase difference AF is performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-113984, filed May 18, 2012 which is hereby incorporated by reference herein in its entirety.

What is claimed is:

1. A lens apparatus detachable from an image pickup apparatus, the lens apparatus comprising:
   a focus lens configured to provide focusing;
   a driver configured to drive the focus lens;
   a first position detector configured to detect a position of the focus lens; and
   a controller configured to correct the position of the focus lens detected by the first position detector to a position of the focus lens in a predetermined optical characteristic, to transmit a corrected position of the focus lens to the image pickup apparatus, to correct driving information of the focus lens in the predetermined characteristic received from the image pickup apparatus to driving information of the focus lens in a current optical characteristic, and to instruct the driver to drive the focus lens in accordance with the position of the focus lens detected by the first position detector and corrected driving information of the focus lens.

2. The lens apparatus according to claim 1, further comprising an optical characteristic detector configured to detect a current optical characteristic,
   wherein the controller calculates, as a correction value, a shift amount of the a focus position caused by a difference between the current optical characteristic detected by the optical characteristic detector and the predetermined optical characteristic, and calculates the corrected position of the focus lens by subtracting the correction value from the position of the focus lens detected by the first position detector.

3. The lens apparatus according to claim 2, further comprising a filter configured to be inserted into and ejected from an optical axis of the focus lens, and to adjust a light quantity,
   wherein the optical characteristic detector detects an insertion and ejection of the filter, and the difference between the current optical characteristic and the predetermined optical characteristic is a difference between a refractive index of the filter and a refractive index of air.

4. The lens apparatus according to claim 2, further comprising a diaphragm configured to adjust a light quantity,
   wherein the optical characteristic detector detects an aperture value of the diaphragm, and the difference between the current optical characteristic and the predetermined optical characteristic is a difference between the aperture value and a maximum aperture value.

5. The lens apparatus according to claim 2, wherein the optical characteristic detector detects a temperature of the lens apparatus, and the difference between the current optical characteristic and the predetermined optical characteristic is a temperature change.

6. The lens apparatus according to claim 5, further comprising:
   an image pickup optical system configured to form an object image and including a focus lens; and
   a lens barrel configured to house the image pickup optical system,
   wherein the controller calculates the correction value by multiplying the temperature change by a coefficient representative of a rate of the shift amount of the focus position caused by an extension and shrinkage between the image pickup optical system and the lens barrel by the temperature change.

7. The lens apparatus according to claim 5, wherein the image pickup apparatus includes an image sensor configured to photoelectrically convert an object image, and
   wherein the controller calculates the correction value by multiplying the temperature change by a coefficient representative of a rate of the shift amount of the focus position caused by an extension and shrinkage of a flange focal length that is a distance between the lens apparatus and the image sensor in the image pickup apparatus, by the temperature change.

8. The lens apparatus according to claim 1, further comprising:
   a zoom lens configured to adjust a focal length; and
   a second position detector configured to detect a position of the zoom lens,
   wherein the controller obtains the corrected position of the focus lens based upon a first cam locus in the predetermined optical characteristic representing a relationship between the position of the focus lens and the position of the zoom lens for a predetermined object distance and the position of the zoom lens detected by the second position detector, and drives the focus lens to the position of the focus lens corresponding to a zoom position as the driving information of the focus lens in the predetermined optical characteristic received from the image pickup apparatus, in a second cam locus in the current optical characteristic for the predetermined object distance.

9. The lens apparatus according to claim 2, wherein the controller obtains a target position as driving information of the focus lens in the current optical characteristic by adding the correction value to a target position of the focus lens obtained based upon the driving information of the focus lens in the predetermined optical system received from the image pickup apparatus.

10. The lens apparatus according to claim 1, wherein the image pickup apparatus includes an image sensor configured to photoelectrically convert an object image, and
    wherein the controller receives driving information of the focus lens as an image plane moving amount of the image sensor from the image pickup apparatus.

11. The lens apparatus according to claim 1, further comprising:
    a zoom lens configured to adjust a focal length; and
    a second position detector configured to detect a position of the zoom lens,
    wherein the controller transmits to the image pickup apparatus a cam locus that is made by normalizing a cam locus in the predetermined optical characteristic representing a relationship between the position of the zoom lens and the position of the focus lens in each of a close object distance, an infinite object distance, and an intermediate object distance, by using a maximum distance among distances between a close end and an infinite end for respective positions of the zoom lens, and
    wherein the controller obtains driving information of the focus lens which corresponds to driving information of the focus lens designated in a normalized cam locus by the image pickup apparatus, in the cam locus which has not yet been normalized, as the driving information of the focus lens in the predetermined optical characteristic received from the image pickup apparatus.

12. An image pickup system comprising a lens apparatus, and an image pickup apparatus to which the lens apparatus is detachably attached,
    wherein a lens apparatus includes a focus lens configured to provide focusing, a driver configured to drive the focus lens, a first position detector configured to detect a position of the focus lens, and a controller configured to correct the position of the focus lens detected by the first position detector to a position of the focus lens in a predetermined optical characteristic, to transmit a corrected position of the focus lens to the image pickup apparatus, to correct driving information of the focus lens in the predetermined characteristic received from the image pickup apparatus to driving information of the focus lens in a current optical characteristic, and to instruct the driver to drive the focus lens in accordance with the position of the focus lens detected by the first position detector and corrected driving information of the focus lens, and wherein the image pickup apparatus including a memory, and a focus preset unit configured to store a position of the focus lens in the memory and to instruct the controller to move the focus lens to the position of the focus lens stored in the memory, wherein the position of the focus lens sent by the focus preset unit to the controller is driving information of the focus lens in the predetermined optical characteristic.

13. An image pickup system comprising a lens apparatus, and an image pickup apparatus to which the lens apparatus is detachably attached, wherein a lens apparatus includes a focus lens configured to provide focusing, a driver configured to drive the focus lens, a first position detector configured to detect a position of the focus lens, and a controller configured to correct the position of the focus lens detected by the first position detector to a position of the focus lens in a predetermined optical characteristic, to transmit a corrected position of the focus lens to the image pickup apparatus, to correct driving information of the focus lens in the predetermined characteristic received from the image pickup apparatus to driving information of the focus lens in a current optical characteristic, and to instruct the driver to drive the focus lens in accordance with the position of the focus lens detected by the first position detector and corrected driving information of the focus lens, and wherein the image pickup apparatus includes:

an image sensor configured to photoelectrically convert an object image;

a focus signal generator configured to generate a focus signal representative of a focus state; and a calculator configured to calculate driving information of the focus lens as an image plane moving amount of the image sensor so that the focus signal generated by the focus signal generator represents in-focus.

* * * * *